United States Patent [19]

Thompson et al.

[11] 4,382,678

[45] May 10, 1983

[54] MEASURING OF FEATURE FOR PHOTO INTERPRETATION

[75] Inventors: Henry A. Thompson, Manassas; Clifford Kottman, Springfield, both of Va.; Walter H. Mueller, New Carrollton; Robert E. Phebus, Clarksburg, both of Md.

[73] Assignee: The United States of America as represented by the Secretary of the Army, Washington, D.C.

[21] Appl. No.: 278,263

[22] Filed: Jun. 29, 1981

[51] Int. Cl.³ .................. G01C 21/06; G01B 11/02; G01B 5/24

[52] U.S. Cl. .................................. 356/150; 33/1 A; 356/372; 356/397

[58] Field of Search .............. 356/150, 372, 397; 33/1 A, 20 D

[56] References Cited

U.S. PATENT DOCUMENTS

| | | | |
|---|---|---|---|
| 1,649,406 | 11/1927 | Holst | 33/1 A |
| 2,261,201 | 11/1941 | Wilson | 33/1 A |
| 2,418,264 | 4/1947 | James et al. | 356/150 |
| 3,217,413 | 11/1965 | Coleman | 33/1 A |
| 3,535,043 | 10/1970 | Hong | 356/397 |
| 3,614,410 | 10/1971 | Bailey et al. | 33/1 A |
| 3,750,293 | 8/1973 | Forrest | 33/20 D |
| 4,172,662 | 10/1979 | Vogel | 356/397 |

Primary Examiner—William H. Punter
Attorney, Agent, or Firm—William G. Gapcynski; Arthur I. Spechler; Werten F. W. Bellamy

[57] ABSTRACT

A method and apparatus is disclosed for determining the height, width, length and orientation of an object from the feature image of the object found on oblique panoramic aerial photography. A magnifying eyepiece is provided with a calibrated reticle for measuring the dimensions of the feature image. The eyepiece also has a reference mark and indicia about the eyepiece for measuring the orientation from true north of the longitudinal axis of the feature image. The actual measurements of the object are quickly determined from the measurements of the feature image using a suitably programmed calculator supplied with the photograph and camera parameters.

10 Claims, 6 Drawing Figures

MEASURING OF FEATURE FOR PHOTO INTERPRETATION

The invention described herein may be manufactured, licensed and used by or for the Government for governmental purposes without the payment of any royalties thereon.

FIELD OF THE INVENTION

This invention relates generally to an apparatus and method for determining the dimensions and orientation of the feature image of an object (e.g. building, bridge, etc.) from oblique panoramic aerial photography so that the actual dimensions and orientation relative to true north of the object are determined.

BACKGROUND OF THE INVENTION

A prior art method for measuring the dimensions and orientation of an object which is of particular interest here relies on the use of unrectified or oblique aerial panoramic photography and rectified aerial photography. Unrectified photography is aerial photography where the lens of the camera is tilted away from vertical or z-axis toward the direction of flight or x-axis (usually by more than 3°) and the lens is swept from side to side or about the y-axis. The latitude, heading, tilt of the camera, and focal length of the camera are constantly recorded as the film is being shot and afterwards tabulated for reference to each frame of the photography. Rectified photography is the transformation of the unrectified photography to an equivalent vertical photograph where a true horizontal relation in an x-y plane between points on the photographic image and a ground or map coordinate system is obtained.

In accordance with this prior art method, the unrectified photograph is first scanned for features of interest using a Bausch and Lomb "240 Zoom" stereomicroscope with a magnification of 10×. Once a feature of interest is located, the zoom 240 scope is moved out of the way and the same feature is relocated on the unrectified photograph with a 40 power microscope having a reticle which measures in increments of 0.001 inch. Using this reticle, a height measurement of the feature image is made in thousandths of an inch. Thereafter, a special template is used to locate the position of the feature on the unrectified photography by the parameters of obliquety and these photo coordinates are recorded. The parameters of obliquety are measured in angular degrees from a true vertical position. Each angle in "x" and "y" measurement has a unique scale factor which is determined for each location of each photo from a table of scale factors.

With this information, the actual height of the object above the ground in feet is determined using the following formula:

$$\text{Ground Distance} = \frac{\text{(Altitude) (Scale Factor) (Image Distance/12)}}{\text{(Focal Length)}}$$

where ground distance in the height above the ground in feet of the top of the object; altitude is the height of the camera above the ground in feet; scale factor is a predetermined factor for determining heights for each angle in "x" and "y" directions; image distance/12 is the measured image displacement of the height of the object in inches divided by 12 to convert the measurement to feet; and focal length is the focal length of the camera taking the photograph in feet. This formula is used only for determining heights from unrectified photographs and must be used for each feature image of interest.

Next, in order to obtain the length, width and orientation of the feature, the feature must again be located on the rectified photograph. It is virtually impossible to take length and width measurements and orientation measurements from unrectified film because of the complexity of the formulas and methods for taking the measurements. With rectified film, distortions have been taken out with regard to the correct position of features although vertical distortion still exists. Using a seven power Bausch and Lomb magnifier with a scale having ticks marked off in five thousandths of an inch increments, the feature image length and width are measured, if possible. If they are measureable, these dimensions are then multiplied by a factor determined from the scale of the photograph and recorded. Of course, if these dimensions are not capable of being measured on the rectified photograph because of loss of resolution, the feature cannot be measured and the time spent so far has been wasted. The needed features must then be guessed at or obtained through a very complex measuring procedure on the unrectified film. Assuming that the feature dimensions are recorded, the feature is then relocated on the rectified photograph and its oreentation or degrees from true north are determined by the use of a clear plastic protractor oriented to grid north. After this long process, hopefully all information on the feature is complete. Then, this long and time consuming procedure must be repeated for each feature of interest on the photograph, and the disadvantages of the procedure are evident.

In so far as the viewing and measuring of an object or feature is concerned, the prior art has disclosed many devices to aid in this process. For example, in U.S. Pat. No. 3,119,185 to Gray, an optical and magnifying comparator is disclosed having a reticle very close to the feature to be measured. The use of a reticle with a cross-hair has also been disclosed in a prior art telescopic gun sight as shown in U.S. Pat. No. 2,997,916 to Friedman et al. and in a stereogoniometer as shown in U.S. Pat. No. 3,535,043 to Hong. The stereogoniometer disclosed in the Hong reference also includes a protractor scale with an adjustable cross-hair. There has also been disclosed, in U.S. Pat. No. 4,051,483 to Suzuki, a system for measuring and recording the three dimensional configuration of an object using moiretopography and a computer. The location of a feature on a photograph has also been performed using two stereo images. Such a system is described in U.S. Pat. No. 3,750,293 to Forrest.

SUMMARY OF THE PRESENT INVENTION

In accordance with the present invention, a method and apparatus are disclosed for measuring the actual dimensions and longitudinal axis orientation of a feature image of a structure such as a building, bridge, tower, etc. from an oblique panoramic aerial photograph. A magnifying eyepiece having an elongate tube is provided with a calibrated reticle for viewing the photograph and for measuring the dimensions of height, width, and length of the feature image. Located on the eyepiece is a reference mark which is adjusted to align with one of the photograph axes. This reference mark is then used to determine the angular orientation of the feature image by reference to indicia located about the eyepiece. With the photograph and camera parameters, and the measurements of the feature image, the actual dimensions and orientation of the feature are quickly and easily determined.

In a preferred embodiment, a computer is suitably programmed to perform the calculations necessary to determine height, width and length dimensions and orientation of the feature image. Preferably, the calculated measurements are printed onto paper which acts as a permanent record.

It is an advantage of the present invention that the measurement can be made quickly and easily from one photograph. This is of particular importance where a large number of features have to be measured and recorded.

Other features and advantages of the present invention are stated in or are apparent from the detailed description of a presently preferred embodiment of the invention found hereinbelow.

DETAILED DESCRIPTION OF THE PREFERRED EMBODIMENT

Figure 1:
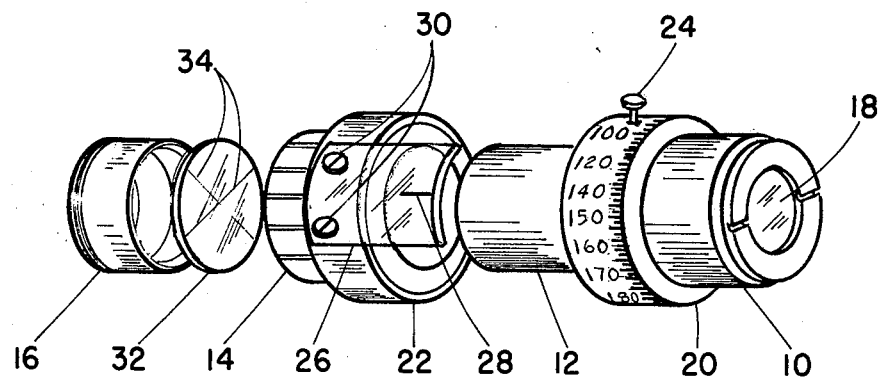
FIG. 1 is an exploded perspective view of the eyepiece apparatus of the present invention.
Figure 2:
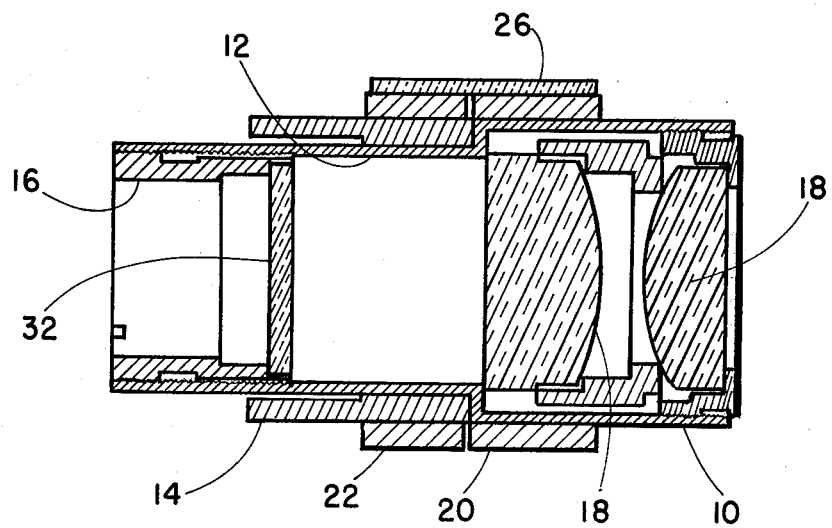
FIG. 2 is a cross-sectional elevation view of the eyepiece depicted in FIG. 1 after assembly.

With reference now to the drawings in which like numerals represent like elements throughout the several views, a presently preferred embodiment of a magnifying eyepiece 10 of the present invention for use in a stereomicroscope is depicted in FIGS. 1 and 2. In an exemplary embodiment, eyepiece 10 is a modified standard Bausch and Lomb 10 power wide field eyepiece part no. 31-15-71-02 having a tube 12, a focusing ring 14, a collar 16, and glass lenses 18. The standard Bausch and Lomb eyepiece 10 is modified by rotatably positioning a drum dial 20 having a set screw 24 around tube 12. Drum dial 20 is divided into two degree increments and in the exemplary embodiment is a standard item (part no. M2-12) manufactured by "Pic" Precision Components Co. of Ridgefield, Conn. An aluminum ring 22 is securely attached to focusing ring 14. Extending away from aluminum ring 22 out over drum dial 20 is a clear plastic shield 26 having a reference mark 28 thereon. Clear shield 26 is attached to ring 22 by two screws 30. Inside of tube 12 and mounted by collar 16 is a reticle 32. Reticle 32 has cross-hairs 34 which are calibrated with ticks to a predetermined scale such as thousandths of an inch at the focal plane.

Figure 3:
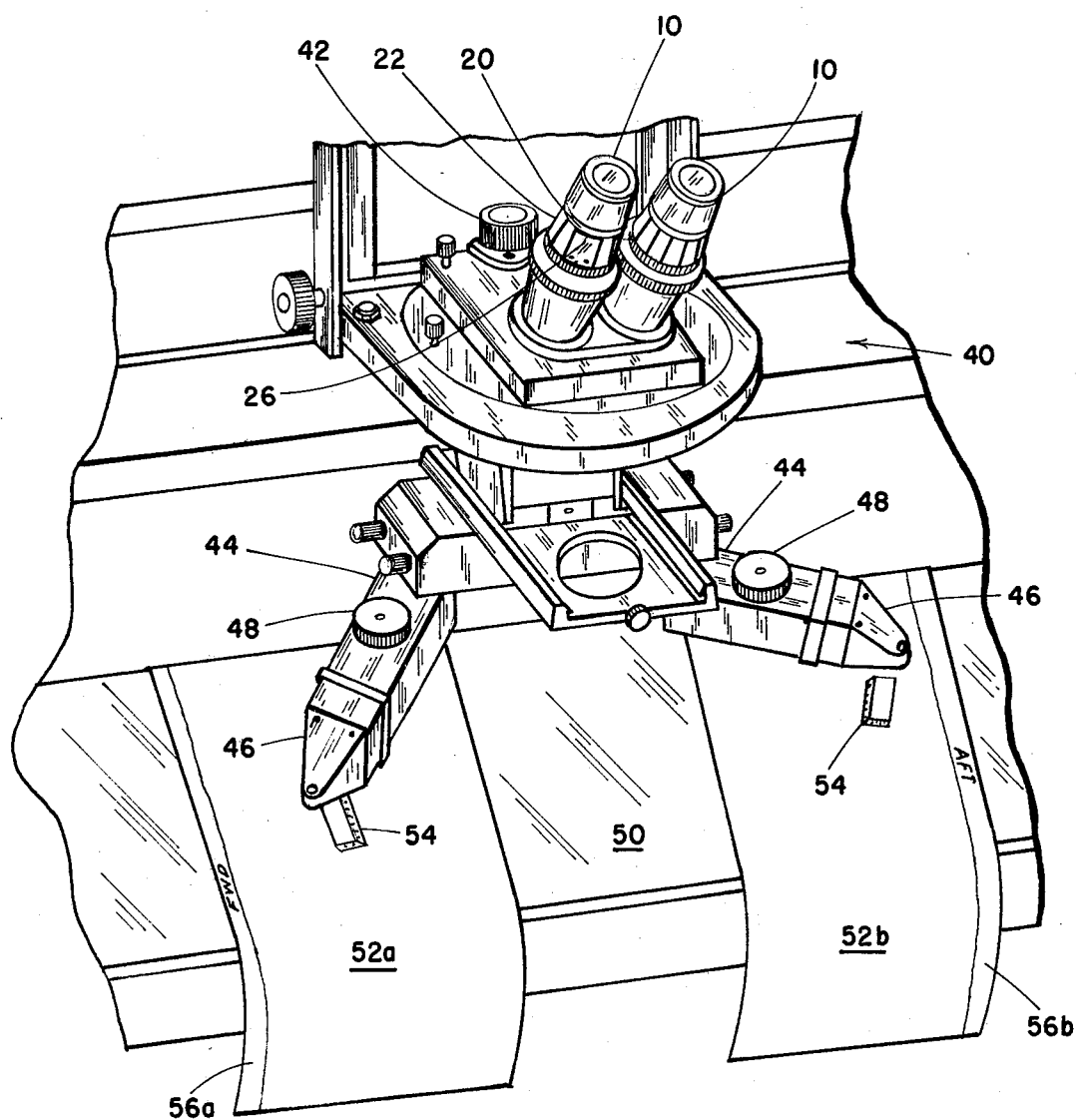
FIG. 3 is a schematic perspective view of a stereomicroscope using the eyepiece depicted in FIG. 1.

Depicted in FIG. 3 is a steromicroscope 40 having eyepieces 10. In this exemplary embodiment, stereomicroscope 40 is a standard Bausch and Lomb "240 Zoom" stereomicroscope part No. 31-15-71-02 and having a magnification of 10×. As shown, stereomicroscope 40 includes a power changer knob 42 and stero rhomboid arms 44 having a stereo lens 46 and a focusing knob 48. Stereo lenses 46 are positioned over a light table 50 on which the unrectified oblique panoramic photographs 52a and 52b are located. Photograph 52a is the forward photograph showing the feature of interest, in this case a building 54. Photograph 52b is the aft photograph which also shows building 54. It should be noted that the forward title edge 56a of photograph 52a is on the right while the aft title edge 52b of photograph 52b is on the left.

In order to quickly process the information required on a plurality of different features from a single oblique aerial photograph, a calculator is conveniently used. For this purpose, a Texas Instruments No. 59 programmable calculator mounted on a standard Texas Instruments printing cradle PC100-A designed to receive the TI 59 calculator is used in the exemplary embodiment. The calculator program is programmed with all of the math necessary to calculate actual height, width, length and orientation of features as they are measured on the photograph. Prior to any calculations, the program also prompts the user to input the camera and photograph parameters required to perform the calculations. The programs will be discussed in detail subsequently.

The method of operation of the invention is as follows. Initially, the altitude (in feet), tilt angle of the camera (in degrees), heading (in degrees), and focal length of the camera (in inches) for each frame or photograph used is recorded from the information which is provided on the photograph. Next, the forward photograph 52a and aft photograph 52b are placed on light table 50 under stereomicroscope 40 with title edges 56a and 56b as shown in FIG. 3. For convenience, forward photograph 52a is taped to light table 50 to prevent movement thereof. In this manner, stereo viewing is obtained by moving aft photograph 52b only.

Eyepiece 10 is then prepared for use by focusing the scaled crosshairs 34 of reticle 32 on photograph 52a. This is accomplished by removing eyepiece 10 from stereomicroscope 40 and rotating collar 16 until focus is achieved when eyepiece 10 is reinserted. Next, set screw 24 is loosened and drum dial 20 is rotated until reference mark 28 of shield 26 is aligned with the 0° mark on drum dial 20. Holding drum dial 20 in this position, eyepiece 10 is rotated until crosshair 34 is aligned with one of the photographic axes as indicated by the edge of photograph 52a. Set screw 24 is then tightened so that drum dial 20 is fixed to tube 12.

The scale of crosshairs 34 are then calibrated so that each increment equals one thousandth of an inch. This is accomplished by placing a Bausch and Lomb Reticle which has five thousandths of an inch increments under arm 44 so as to be aligned with crosshairs 34. Power changer knob 42 is then adjusted until five increments of the scale on crosshairs 34 equal one increment on the Bausch and Lomb Reticle. With calibration complete, power changer knob is preferably taped or marked to prevent any further movement.

Finally, photograph 52a is scanned for features of interest. When a feature of interest is located, crosshairs 34 in eyepiece 10 are rotated so as to measure the height, length and width of the feature, such as building 54. As the longitudinal measurement of building 54 is made, the orientation of building 54 is also read from drum dial 20 which rotates with eyepiece 10, by use of reference mark 28. By keying these measurements into a suitably programmed computer (discussed subsequently), the actual height, length, width and orientation of building 54 are quickly and easily determined and recorded. Further scanning of photograph 52a for further features of interest and their measurement is thus rapidly accomplished.

A suitable calculator program follows which is designed for use with the present invention with a Ti159 calculator provided with a PC-100A printer attachment. This program computes the length, width, height and orientation of features (e.g. buildings, towers, bridges, etc.) from measurements such as those discussed above made on panoramic aerial photography. The program is broken into seven modules denoted D, C, B, A, A', B', and C' which are accessed by pushing the corresponding buttons on the Ti159 calculator.

Module D prompts the user to input the camera constants: Elevation of the camera above terrain (in feet)=E; tilt of camera (in degrees)=P; heading of camera (degrees clockwise from north)=H; and focal length (in inches)=F. The prompting is done via the printing of the mnemonics "ELEV," "TILT," "HDG," and "FOCL" on the PC-100A printer. A record of each constant entered is automatically produced by the printer adjacent to the mnemonic label. The constants are stored in the calculator memory for future use. This module needs to be run once after the program is loaded, and again whenever the photograph being measured is changed.

Module C prompts the user to input a scale constant by printing the mnemonic "SCAL" on the PC-100 printer. The constant entered is printed adjacent to the mnemonic label for a permanent record. The constant is the number of ticks per inch of film in the reticle of the viewing instrument. (With minor program changes, this constant may also incorporate units of measurement on the camera constants and output other than the inches and feet specified here). This module is run once when the program is loaded and again whenever viewing magnification is changed (e.g. when a zoom lens is reset).

Module B prompts the user to input the film coordinates of the feature being measured in terms of the Scan angle—A and Pitch unit via the printing of the mnemonics "SCNA" and "PTCH" on the PC-100A printer. The constants entered are printed adjacent to their mnemonic labels for a permanent record. Module B then computes the scale of the photography for horizontal features parallel and perpendicular to the principal plane and for vertical features. These scales are called A1, B1 and C1 respectively. It also computes the angle between the principal plane and the film y-axis (called Q2) and the angle between the principal plane and north (called Q1). This module is run once for each region (e.g. one inch square) of film which has features requiring measurement and the scales and angles computed are used for all features in that region.

Module A allows the user to input three feature identification codes (which are printed adjacent to the mnemonics "FAC," "FID," and "SMC") along with the number of reticle ticks observed along the length, width and height of the image and the angle (degrees) between the film y-axis (or trailing edge of the film) and the feature length. These last four entries are printed adjacent to the mnemonic labels "ILN," "IWD," "IHT," "IOR" for "input length," "input width," "input height" and "input orientation." Module A then computes the length, width, and height of the feature in feet, rounds to the nearest five feet, and prints these values adjacent to the mnemonics "LONG," "WIDE," and "HIGH." Finally, module A computes the angle between the long side of the feature and north, rounds it to the nearest five degrees, and prints it adjacent to the mnemonic "NRTH." As it is the most frequently used, module A does not prompt the user beyond the first entry "FAC" in order to save paper.

Module A' prompts the user to input a single height measurement via the printing of the mnemonic "IHT." It then calculates and prints the feature height to the nearest foot adjacent to the mnemonic "HIGH." This module avoids the length, width, orientation, and feature identification code entries required in module A when only a height measurement is wanted. Moreover, it does not round to the nearest five feet.

Module B' prompts the user to input film length and orientation observations of a feature via the printing of the mnemonics "ILN" and "IOR" then computes the length of the feature, prints it to the nearest foot adjacent to "LONG," computes the orientation to north of the feature, and prints it to the nearest degree adjacent to "NRTH." This module avoids the width, height and feature identification code entries required in module A when only a length or orientation is wanted. Moreover, the length is not rounded to the nearest five feet, nor is orientation rounded to nearest five degrees.

Module C' computes and prints adjacent to the mnemonic "VRTI" the angle between film y-axis and vertical features. This is sometimes useful to descriminate between vertical features and their shadows, and to determine whether a feature is vertical.

Figure 5:
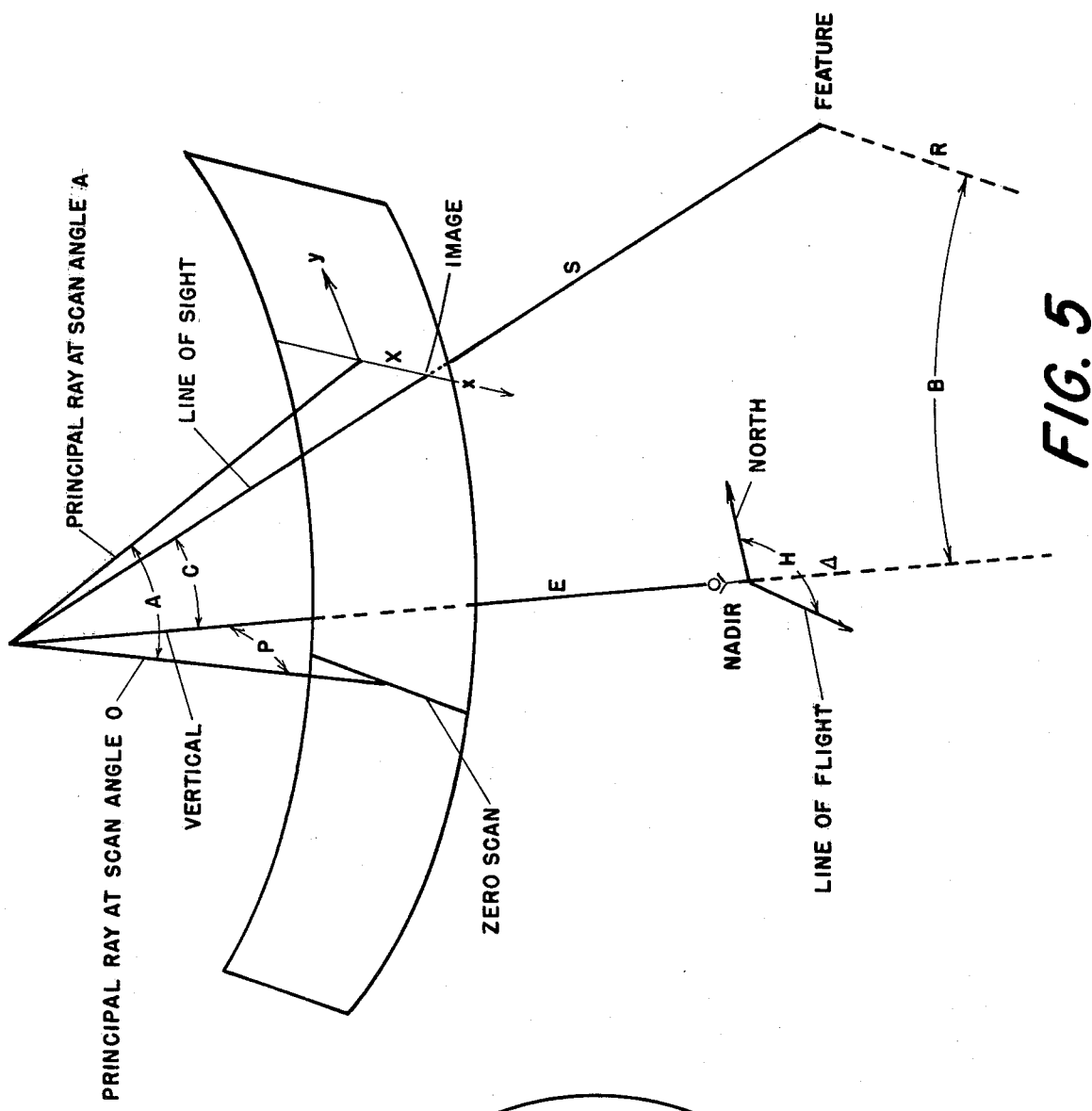
FIG. 5 is a schematic perspective view of the camera view of the film and the earth below.
Figure 4:
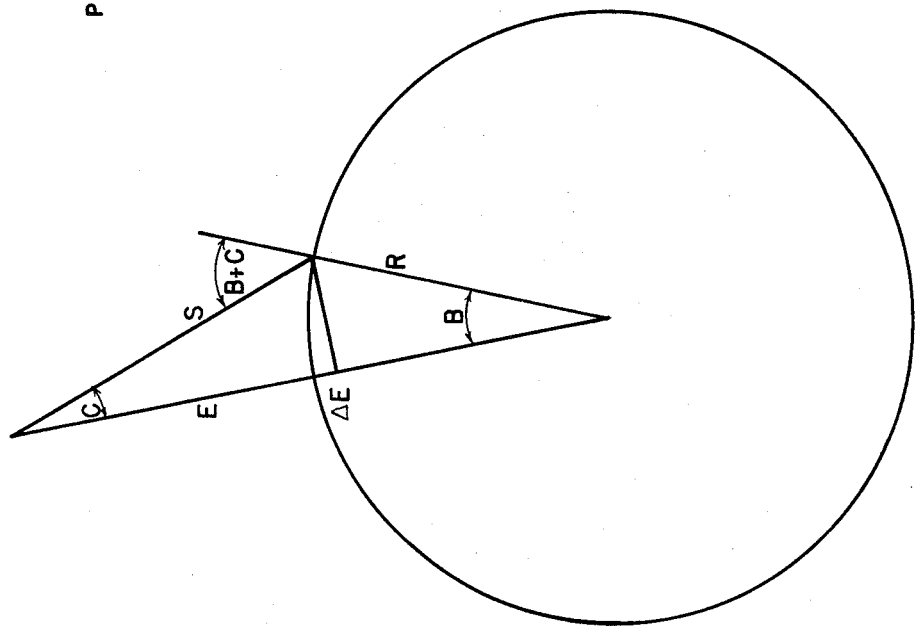
FIG. 4 is a schematic cross-sectional elevation view of an object as viewed by a camera at an elevation above the earth.
Figure 6:
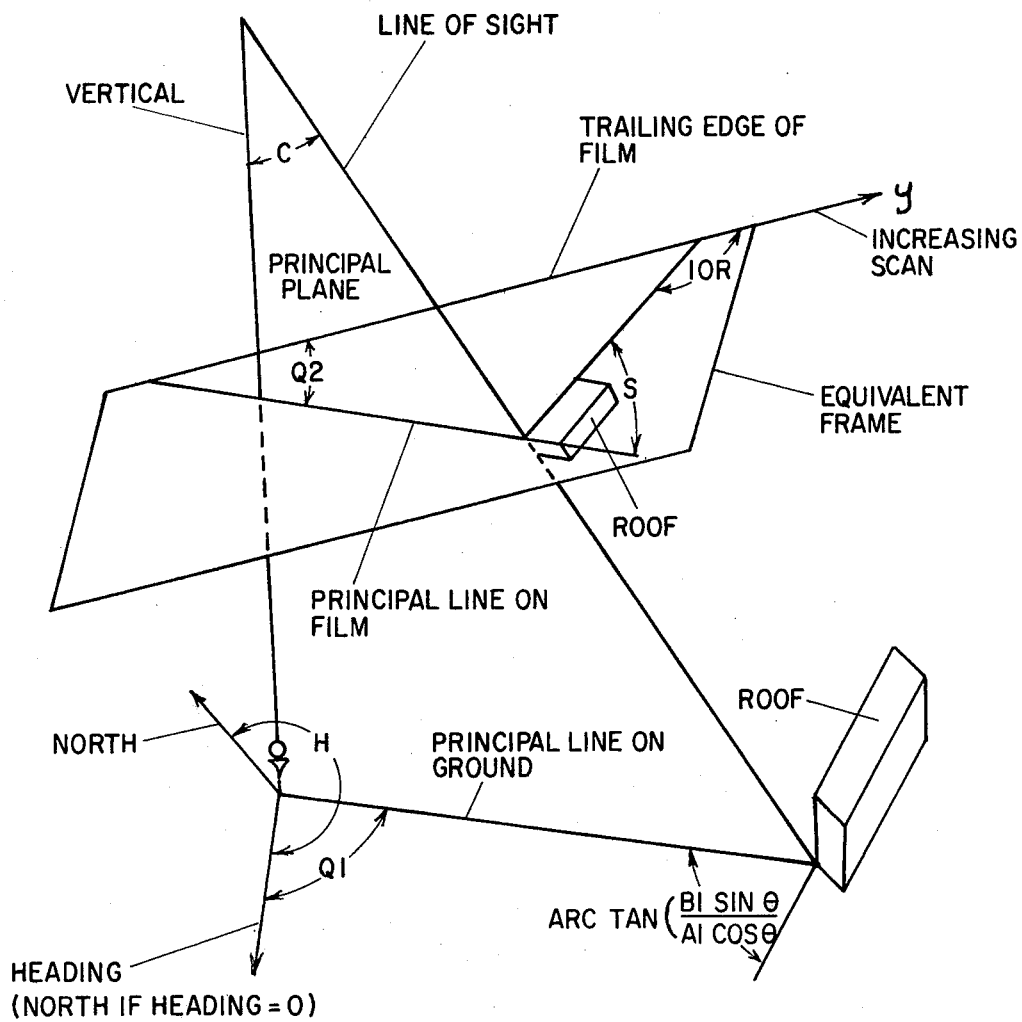
FIG. 6 is a schematic perspective view of an object and the image of the object on an equivalent frame.

The formulas used to determine the length, width, and height of a feature are as follows. Reference is made to FIGS. 4, 5 and 6 and to the following glossary.

Glossary of symbols and terms:

(units specified on inputs constants.)

A=scan angle (degrees)
A1=horizontal scale in principal plane
B=central earth angle
B1=horizontal scale perpendicular to principal plane
C=cone angle=angle between line of sight and vertical
C1=vertical scale
E=camera elevation above terrain (feet)
F=focal length of camera (inches)
H=heading of camera (degrees clockwise from north)
IHT=input height (ticks)
ILN=input length (ticks)
IOR=input orientation (degrees clockwise form film y-axis)
IWD=input width (ticks)
L-Scale=horizontal scale in direction of feature length
M=model scale
NP=nominal tilt angle
P=tilt angle (degrees)
Principal plane=plane containing line of sight and vertical
PTCH=pitch unit (from overlay)
Q1=angle between north and principal plane on the ground
Q2=angle between trailing film edge and principal plane on the fim
R=radius of earth
S=slant range
SCAL=number of reticle ticks per inch
T=camera to ground matrix
W-Scale=horizontal scale of photo in direction of feature width.
X=film x-coordinate of feature.

ΔE = earth curvature correction
θ = angle between image of feature and principal plane on the film.

Derivation of formulas

A camera tilted P degrees and rolled A degrees has a camera to ground matrix $$T = \begin{bmatrix} 0 & -\cos A & \sin A \\ \cos P & -\sin P \sin A & -\sin P \cos A \\ \sin P & \cos P \sin A & \cos P \cos A \end{bmatrix}$$

In the following, (x,y,z) denote camera vectors where the xy-plane is the film plane, the y-axis is in the direction of increasing scan, and the x-axis is along the line of flight. And [x,y,z] denote ground vectors where ground x points east and ground y points north. The film x coordinate of an image is computed by $$x = (PTCH - NP) \sin P,$$

where NP = nearest integer to $|P|$. The line of sight vector is (X,0,−F) or [−F sin A, X cos P+F sin P cos A, X sin P−F cos P cos A]. The line of sight projected to the ground has coordinates [−F sin A, X cos P+F sin P cos A, 0] and the angle this vector makes within north is Q1. Thus $$Q1 = \arctan\left(\frac{-F \sin A}{X \cos P + F \sin P \cos A}\right).$$

The principal plane (in camera coordinates) is spanned by (x,0,−F) and T transpose of [0,0,1] or (sin P, cos P sin A, cos P cos A). The linear combination of these vectors in the film xy-plane is F(sin P, cos P sin A, cos P cos A) + cos P cos A (X,0, −F) = (X cos P cos A + F sin P, F cos P sin A, 0)

and the angle this vector makes with the camera y-axis is $$Q2 = \arctan\left(\frac{X \cos P \cos A + F \sin P}{F \cos P \sin A}\right).$$

The angle the line of sight makes with the vertical is the cone angle, C, which by the law of cosines is $$C = \arccos \frac{F \cos P \cos A - X \sin P}{\sqrt{F^2 + X^2}}$$

The earth central angle B is given by $$B = \arcsin\left(\frac{R + E}{R} \sin C\right) - C$$

The line of sight has length S, the slant range, where $$S = (E + \Delta E)/\cos C$$

and where $$\Delta E = R(1 - \cos B)$$

The A1, B1 and C1 scales are then computed to be $B1 = S$ $A1 = B1/\cos(C+B)$ $C1 = B1/\sin(C=B).$ The angle IOR is the angle between the film y-axis and a feature length, and Q2 is the angle between film y-axis and the principal plane, therefore $\theta = IOR - Q2$ is the angle between the feature length and the principal plane. The scale of the photography in the direction of the feature is therefore $$L\text{-SCALE} = \sqrt{(A1 \cos 0)^2 + (B1 \sin 0)^2}$$

The ground length of the feature is then $$\text{LONG} = (ILN) \cdot (L \text{ Scale}) \cdot M \quad \text{where}$$
$$\text{(feet)} \quad \text{(ticks)} \quad \text{(feet)} \quad \text{(1/ticks)}$$

$$M = \frac{1}{F \text{ (inches)} \cdot SCAL \text{ (ticks/inch)}}$$

The length is rounded to the nearest five feet by the formula $$\text{ROUNDED LONG} = 5 \cdot INT\left(\frac{\text{LONG} + 2.5}{5}\right)$$

The width is computed by

WIDE = (IWD)·(W−Scale)·M where $$W\text{-Scale} = \frac{L\text{-scale}}{\sqrt{\frac{(A1 \cos \theta)^2}{B1^2} + \frac{(B1 \sin \theta)^2}{A1^2}}}$$

Justification of the W-Scale formula

The 2-dimensional transformation from film to ground at the feature is best considered in terms of film and ground coordinates whose x-axes are along the principal plane and whose y-axes are orthogonal to the x-axes. The transformation from film to ground is given by the function $f(x,y) = (x A1, y B1).$ A lineal feature whose image is oriented θ degrees from the principal plane on the film is then represented by a film vector (cos θ, sin θ). The corresponding vector on the ground is $f(\cos \theta, \sin \theta) = (A1 \cos \theta, B1 \sin \theta).$ A vector perpendicular to this on the ground (widths are assumed perpendicular to lengths on the ground) is (−B1 sin θ, A1 cos θ). And the film vector that has this image is $$f^{-1}(-B1 \sin \theta, A1 \cos \theta) = \left( \frac{B1}{A1} \sin \theta, \frac{A1}{B1} \cos \theta \right).$$

The W-scale is therefore the length of $(-B1 \sin \theta, A1 \cos \theta)$ divided by the length of $$\left( -\frac{B1}{A1} \sin \theta, \frac{A1}{B1} \cos \theta \right).$$

That is $$W\text{-Scale} = \frac{L\text{-Scale}}{\sqrt{\left( \frac{B1}{A1} \sin \theta \right)^2 + \left( \frac{A1}{B1} \sin \theta \right)^2}}$$

The height is computed by $$\text{HIGH} = \text{IHT} \cdot C1 \cdot M.$$

The angle the feature makes with north is computed by $$\text{ORIENTATION} = \arctan \left( \frac{B1 \sin \theta}{A1 \cos \theta} \right) + Q1 + H$$

where $B1 \sin / A1 \cos$ is the tangent of the angle the feature makes with the principal plane on the ground, $Q1$ is the angle between the principal plane and the ground y-axis (which is north if heading is zero) and $H$ is the camera heading. The orientation angle is put in the range 0° to +180° by the operation $$\text{NORTH} = \begin{array}{l} \arctan (\tan \text{ORIENTATION}) \text{ if this is positive} \\ \arctan (\tan \text{ORIENTATION}) + 180 \text{ otherwise} \end{array}$$

The angle "VRT" computed in module C' between the principal plane and y-axis is Q2 put in the range 0° to 180° by $$VRT = \begin{array}{l} \arctan (\tan Q2) \text{ if this is positive} \\ \arctan (\tan Q2) + 180 \text{ otherwise.} \end{array}$$

Program Flow

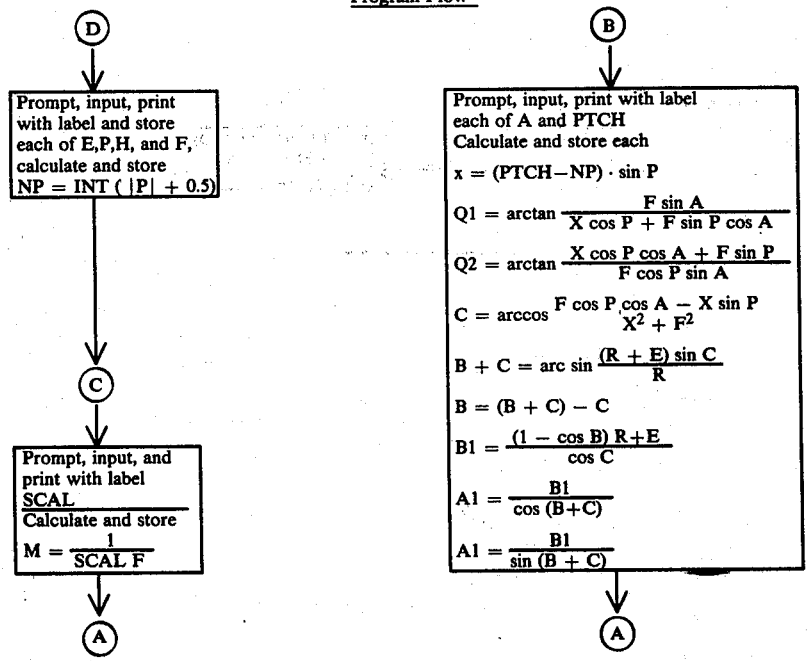

-continued
Program Flow
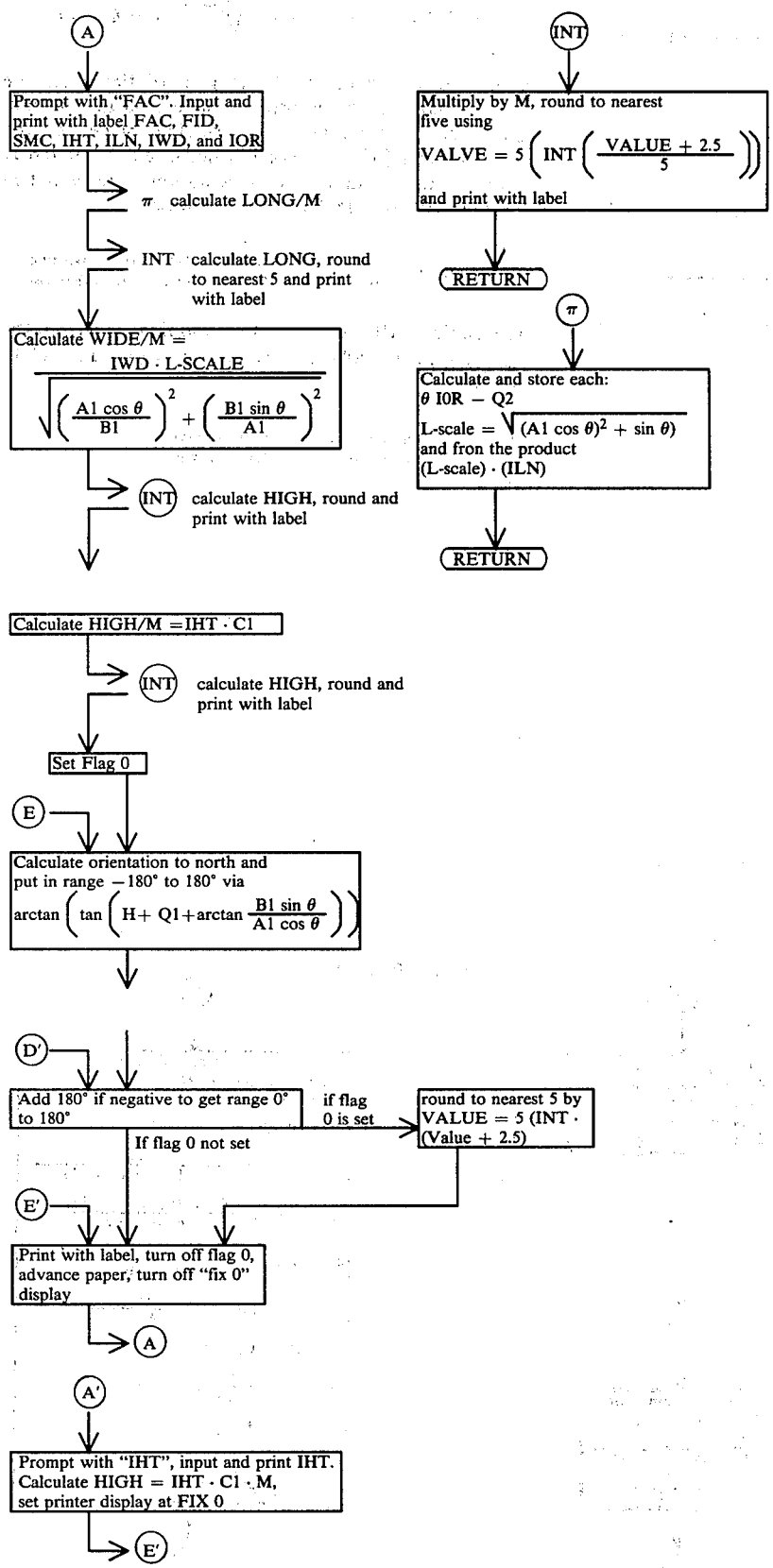

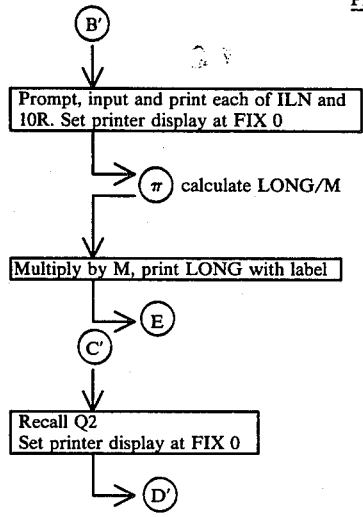

Although the invention has been described in detail with respect to exemplary embodiments thereof, it will be understood by those of ordinary skill in the art that variations and modifications may be effected within the scope and spirit of the invention.

We claim:

1. A method for determining the actual dimensions and orientation of a feature directly from oblique panoramic aerial photography using an eyepiece having a reticle divided into a scale having small increments, the eyepiece including indicia located on the exterior of the eyepiece which indicia is adjustably secured relative to the eyepiece and divided into increments of a circle and a reference mark secured adjacent the indicia, comprising the steps of:
   viewing the photography through the magnifying eyepiece;
   adjusting the indicia and reference mark to align with one of the photograph axes and securing the indicia to the eyepiece;
   scanning the photograph to locate the feature to be measured;
   measuring the height, width, and length of the feature using the scale of the reticle;
   measuring the orientation of the feature by aligning the scale along the longest axis of the feature and reading the indicia adjacent the reference mark; and
   calculating the actual height, width, length and orientation of the feature using the measurements obtained along with the camera and photograph parameters.

2. A method as claimed in claim 1 further including the step of:
   programming a computer to perform the calculations of height, width, length and orientation.

3. A method as claimed in claim 2 further including the step of printing the measurements of height, width, length and orientation obtained from the computer onto paper which acts as a permanent record.

4. A method as claimed in claim 1 further including the step of initially calibrating the scale of the reticle.

5. An eyepiece for a microscope used to locate and measure features in oblique panoramic aerial photography comprising:
   an elongate eyepiece tube mounted for rotation in the microscope;
   a glass reticle with a numbered scale located in said eyepiece tube which is used to measure the height, width and length of the feature image of interest;
   indicia located about said elongate eyepiece tube and divided into increments of a circle; and
   a reference marke mounted on said eyepiece so as to be independently located with respect to said eyepiece tube adjacent said indicia, said reference mark being used to measure the orientation of the feature image in relation to an axis of the photograph such that these measurements, along with the photograph and camera parameters, are used to calculate the actual dimensions and orientation from true north of the feature.

6. An eyepiece device as claimed in claim 5, further comprising an adjustable drum mounted rotatably about said eyepiece tube, said drum including said indicia and being held against rotation by a set screw so that after initial alignment of said reference mark and drum with a photograph axis and tightening of said set screw, the longitudinal orientation of a feature is determined by the angular rotation of the eyepiece tube in agreement therewith as measured by said drum.

7. An eyepiece as claimed in claim 5, further comprising a ring located independently about said elongate eyepiece tube.

8. An eyepiece device as claimed in claim 7, wherein said reference mark is located on a clear plastic shield attached to said ring and which extends over said dial drum.

9. An eyepiece as claimed in claim 5, wherein the numbered scale of said reticle is calibrated into increments of thousandths of an inch at the final plane and said indicia is divided into two-degree increments.

10. An eyepiece as claimed in claim 5, further including a collar which is threadably received in said elongate eyepiece tube for holding said reticle in place.

* * * * *